United States Patent [19]

Iwata

[11] Patent Number: 5,320,726
[45] Date of Patent: Jun. 14, 1994

[54] METHOD OF SUPPLYING HYDROUS FUEL

[75] Inventor: Yosihiro Iwata, Kyoto, Japan

[73] Assignee: Mag Laboratory Co., Ltd., Kyoto, Japan

[21] Appl. No.: 68,693

[22] Filed: May 27, 1993

[30] Foreign Application Priority Data

Jan. 19, 1993 [JP] Japan .................. 5-023223

[51] Int. Cl.⁵ .............................................. C07C 5/00
[52] U.S. Cl. ...................... 204/157.15; 204/155;
 204/157.43; 204/157.5; 204/157.5; 204/157.52
[58] Field of Search ............ 204/155, 157.15, 157.43,
 204/157.5, 157.52

[56] References Cited

U.S. PATENT DOCUMENTS

| | | | |
|---|---|---|---|
| 3,830,621 | 8/1974 | Miller | 431/356 |
| 4,188,296 | 2/1980 | Fujita | 210/222 |
| 4,315,895 | 2/1982 | Bramer et al. | 422/171 |
| 4,569,737 | 2/1986 | Sakata | 585/899 |
| 4,716,024 | 12/1987 | Pera | 422/186.01 |
| 4,865,747 | 9/1989 | Larson et al. | 210/695 |
| 4,933,151 | 6/1990 | Song | 422/186.01 |
| 4,975,406 | 12/1990 | Frestad et al. | 502/302 |
| 4,985,213 | 1/1991 | Ooe et al. | 422/186.01 |
| 5,059,743 | 10/1991 | Sakuma | 585/899 |

FOREIGN PATENT DOCUMENTS 62-233468 10/1987 Japan .

Primary Examiner—John Niebling
Assistant Examiner—C. Delacroix-Muirheid
Attorney, Agent, or Firm—Flynn, Thiel, Boutell & Tanis

[57] ABSTRACT

In a method of supplying hydrous fuel in which water mixed with fuel is positively burned to thereby remarkably economize the fuel consumption. Oil and water which are supplied from an oil tank and a water tank by way of an oil supply pipe and a water supply pipe respectively are mixed with each other and thereafter the mixture of the oil and water is supplied to a combustion chamber by way of a hydrous fuel supply pipe, wherein a low frequency, low voltage and low current signal is applied to a conductive coil wound around the water supply pipe coupled to the water tank so as to apply an electromagnetic induction field to the water and reduce the specific gravity of water, and thereafter the water is mixed with the oil from the oil tank, and subsequently the low frequency, low voltage and low current signal is further applied to a conductive coil wound around the hydrous fuel supply pipe so as to apply the electromagnetic induction field to the hydrous fuel.

2 Claims, 1 Drawing Sheet

METHOD OF SUPPLYING HYDROUS FUEL

BACKGROUND OF THE INVENTION

1. Technical Field

The present invention relates to a method of supplying a hydrous fuel, i.e., a fuel such as gasoline, gas oil or heavy oil used in an engine of an automobile, a boiler, etc, to which water is added for combustion.

2. Prior Art

Some automobile engines improve the atomization of fuel by adding pressurized water to fuel injection devices.

A device for improving fuel by applying an electromagnetic induction field thereto generated by a low frequency, low voltage and low current signal is disclosed in the preceding present applicant's U.S. patent application Ser. No. 07/893391.

The prior arts set forth above, however, are only intended to atomize the fuel and do not contribute to the economy of consumption of fuel so much since they are not intended to burn the water positively.

SUMMARY OF THE INVENTION

The present invention has been made to solve such technical problems of the prior arts and provide a method of supplying a hydrous fuel for supplying oil and water from an oil tank and a water tank by way of an oil supply pipe and a water supply pipe respectively, mixing the same with each other and supplying the mixture of oil and water to a combustion chamber by way of a hydrous fuel supply pipe, characterized in that the method further comprises applying a low frequency, low voltage and low current signal to a conductive coil wound around the water supply pipe coupled to the water tank by an AC signal generator so as to reduce the specific gravity of water, mixing the water with the oil and applying the low frequency, low voltage and low current signal to a conductive coil wound around the hydrous fuel supply pipe by the AC signal generator. As a result, it is possible to remarkably economize fuel consumption by positively burning the water added to the fuel.

PREFERRED EMBODIMENT OF THE INVENTION

Figure 1:
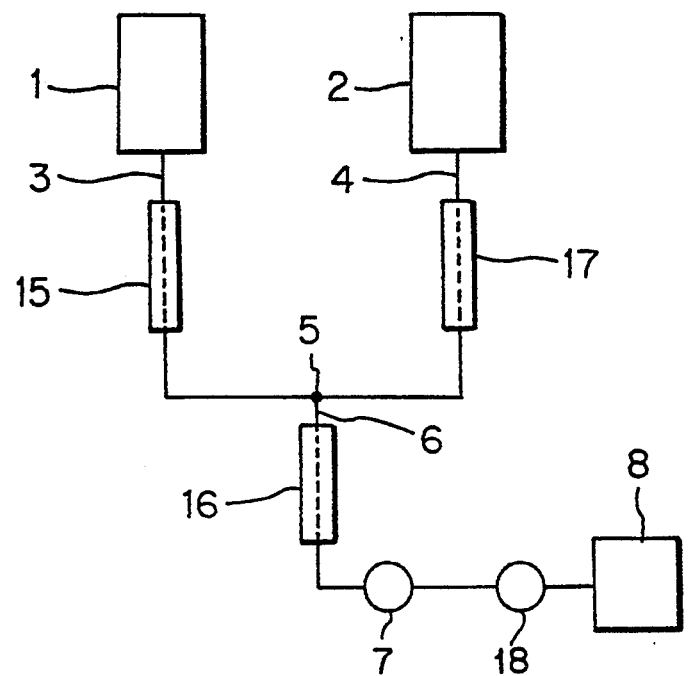
FIG. 1 is a view for explaining the outline of the method of supplying hydrous fuel according to the present invention.

A preferred embodiment of the present invention will be described hereinafter with reference to FIGS. 1 and 2.

In the figures, denoted at 1 is, for example, a water tank loaded on an automobile, etc., 2 is a fuel tank which is filled with gasoline, gas oil or heavy oil depending on the kind of an engine or the kind of a burner employed by a boiler and which is also loaded on an automobile etc.

Denoted at 15, 16 and 17 are devices which have the same structures as that composed of elements 9, 10, 11, 12 and 13 in FIG. 2 (hereinafter referred to as electromagnetic induction field applying means). The electromagnetic induction field applying means 15, 16 and 17 receive a low frequency, low voltage and low current signal from an AC signal generator 14.

Water from the water tank 1 and oil from the oil tank 2 are supplied by way of a water supply pipe 3 and an oil supply pipe 4 respectively, and both of the water and oil are mixed together at the junction 5 so as to be supplied to a combustion chamber 8 through a hydrous fuel supply pipe 6 by way of a pump 7.

Figure 2:
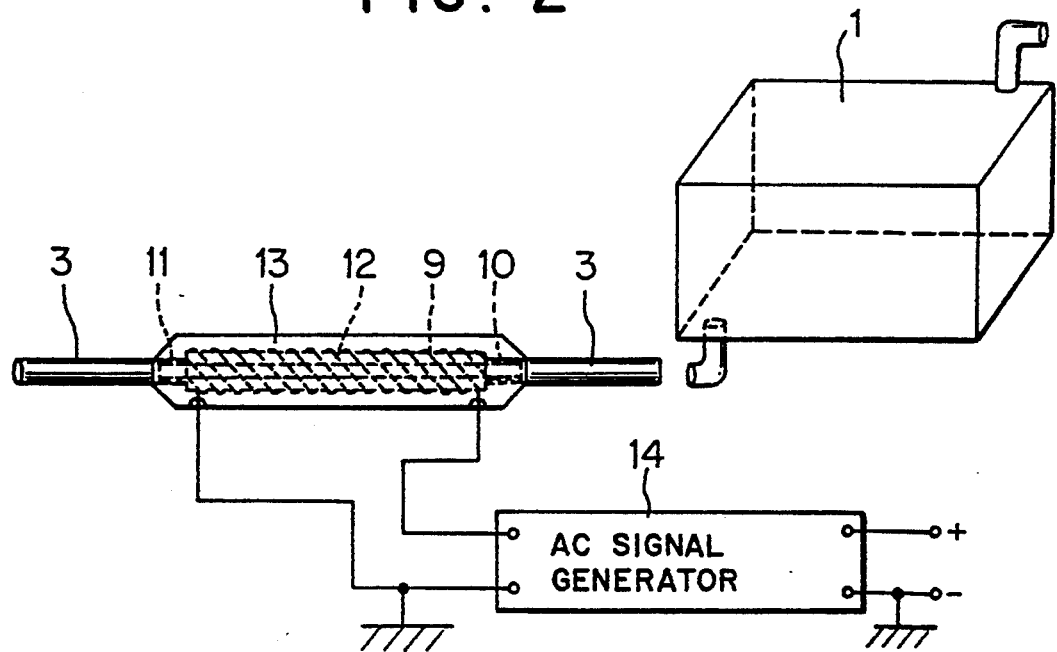
FIG. 2 is a view for explaining the outline of applying a low frequency, low voltage and low current signal according to the present invention.

A water communication pipe 9 made of synthetic resin is provided in the midway of the water supply pipe 3 set forth above which has screw portions 10 and 11 at both ends thereof as illustrated in FIG. 2. The water communication pipe 9 is coupled to the supply pipe 3 by way of the screw portions 10 and 11 so as to be interposed in the midway thereof. A conductive coil 12 is wound around the outer periphery of the water communication pipe 9, and the conductive coil 12 is covered by a protective cover 13 for preventing the coil from getting out of position or being broken due to vibration etc. Denoted at 14 is an AC signal generator coupled to the positive and negative electrodes of a battery loaded on an automobile etc. at the input terminals thereof and to the above-mentioned conductive coil 12 at the output terminals thereof.

For example, a low frequency, low voltage and low current signal of 50 Hz, 1.5 V and 8 mA is applied to the conductive coil 12 set forth above.

An experiment proved that water can be decreased in specific gravity due to molecular decomposition and can be increased in dissolved oxygen by providing the electromagnetic induction field applying means 15 in the midway of the water supply pipe 3.

The aforementioned water the specific gravity of which is reduced to be almost equal to that of oil and oil supplied from the oil supply pipe 4 are mixed with each other at the junction 5 to enter a hydrous fuel supply pipe 6, in the midway of which the electromagnetic induction field applying means 16 is provided as illustrated in FIG. 2, and the conductive oil 12 therein is supplied with, for example, a low frequency, low voltage and low current signal of 160 Hz, 0.5 V and 1.5 to 2 mA generated by the aforementioned AC signal generator 14.

An experiment proved that the hydrous fuel can be subjected to a sufficient mixing and dissolved oxygen can be further increased by providing the electromagnetic induction field applying means 16 in the midway of the hydrous fuel supply pipe 6.

The hydrous fuel which has been subjected to the sufficient mixing and contains increased dissolved oxygen therein is fed to an engine or an combustion chamber 8 of a boiler for combustion by a pump 7.

An experiment proved that the dissolved oxygen can be increased due to the molecular decomposition of oil and the specific gravity of the hydrous fuel further approaches that of oil also when a low frequency, low voltage and low current signal of 100 to 110 Hz, 1.5 V and 2.5 mA is applied by the AC signal generator 14 to the conductive coil 12 of the electromagnetic induction field applying means 17 which is provided in the midway of the oil supply pipe 4.

That is, when oil and water are simply mixed with each other with 1:1 mixing ratio and are subjected to burning, the water is not burned and oil is burned very unstably. The results of experiments are shown in the following table, wherein B is a case that oil (A) and water are supplied with 1:1 ratio and the low frequency, low voltage and low current signal set forth above is applied to both of the water and the hydrous fuel, while C is a case that the low frequency, low voltage and low current signal is applied to the water, the oil and the hydrous fuel according to the present invention.

|  | unit | oil (A) | B | C | Comment |
|---|---|---|---|---|---|
| specific gravity |  | 0.8339 | 0.8368 | 0.8342 | specific gravity at 15° C. |
| flash point | °C. | 80 | 95 | 82 |  |
| high caloric value | cal/g | 11010 | 10970 | 10870 |  |
| low caloric value | cal/g | 10260 | 10210 | 10210 |  |
| dissolved oxygen | mg/l | 8.5 | 11 | 9.5 |  |

As a result, there is no conspicuous change in specific gravity, flash point and caloric value even if the water and the oil are mixed with each other with 1:1 mix ratio. The combustion can be sufficiently performed while $NO_x$ or CO is reduced since the dissolved oxygen is increased.

Moreover, if the hydrous fuel to which the low frequency, low voltage and low current signal is applied is pressurized by a compressor 18 before it is supplied to the engine or the combustion chamber 8 of the boiler by way of the pump 7, the injection of the fuel is performed effectively so that the combustion of the hydrous fuel is further improved.

In short, the specific gravity of water is reduced and the dissolved oxygen in the water is increased by applying an electromagnetic induction field generated by a low frequency, low voltage and low current signal in the conductive coil to the water. Furthermore, the dissolved oxygen in the fuel can be increased so as to cause molecular variation in the fuel and remarkably reduce $NO_x$ and CO contained in the exhaust gas discharged from the engine by applying the electromagnetic induction field generated by the low frequency, low voltage and low current signal to the hydrous fuel. Inasmuch as the process is performed in the fuel supply pipe between the fuel tank and the engine, the electromagnetic induction field influences the whole supplied fuel uniformly and concentratedly to thereby facilitate the improvement of the fuel.

According to the present invention, an electromagnetic induction field generated by a low frequency, low voltage and low current signal in the conductive coil is applied to water and hydrous fuel to cause molecular variation therein so that the water and oil can be mixed with each other sufficiently and the dissolved oxygen in the hydrous fuel can be increased and consequently the water can be also burned in the engine or the combustion chamber of the boiler, whereby the consumption of fuel can be largely economized. It is also very advantageous from the viewpoint of the anti-pollution measures since $NO_x$ or CO contained in the exhaust gas can be remarkably reduced. Furthermore, it is safe and cheap in manufacturing cost since it employs low voltage.

If the electromagnetic induction field generated by the low frequency, low voltage and low current signal in the conductive coil is applied also to the oil in the oil supply pipe, the dissolved oxygen in the fuel can be further increased and the gross caloric value can be also increased so as to further economize the consumption of fuel.

If the hydrous fuel is pressurized by the compressor in front of the engine or the combustion chamber of the boiler, the injection of the fuel is performed more effectively and the combustion of the hydrous fuel is further improved, so that the exhaust gas from the engine or the boiler is further purified to be more advantageous from the viewpoint of the anti-pollution measures.

What is claimed is:

1. A method of supplying hydrous fuel by supplying oil and water from an oil tank and a water tank by way of an oil supply pipe and a water supply pipe respectively, mixing the oil and water with each other and supplying the mixture of oil and water to a combustion chamber by way of a hydrous fuel supply pipe, characterized in that:

said method further comprises:

applying a low frequency, low voltage and low current signal to a conductive coil wound around said water supply pipe coupled to said water tank by AC signal generator means so as to apply an electromagnetic induction field to the water and reduce the specific gravity of water;

mixing said water with said oil to provide hydrous fuel;

applying said low frequency, low voltage and low current signal to a conductive coil wound around said hydrous fuel supply pipe by said AC signal generator means so as to apply said electromagnetic induction field to said hydrous fuel, wherein said signal has a low frequency ranging from 50 to 260 Hz, a low voltage ranging from 0.5 to 1.5 V and a low current ranging from 1.5 to 8 mA and pressurizing said hydrous fuel by a compressor for supply to said combustion chamber.

2. A method of supplying hydrous fuel by supplying oil and water from an oil tank and a water tank by way of an oil supply pipe and a water supply pipe respectively, mixing the oil and water with each other and supplying the mixture of oil and water to a combustion chamber by way of a hydrous fuel supply pipe, characterized in that;

said method further comprises:

applying a low frequency, low voltage and low current signal to a conductive coil wound around said water supply pipe coupled to said water tank by AC signal generator means so as to apply an electromagnetic induction field to the water and reduce the specific gravity of water;

apply said low frequency, low voltage and low current signal to a conductive coil wound around said oil supply pipe coupled to said oil tank by said AC signal generator means so as to apply said electromagnetic induction field to said oil and increase dissolved oxygen therein;

mixing said water with said oil to provide hydrous fuel;

applying said low frequency, low voltage and low current signal to a conductive coil wound around said hydrous fuel supply pipe by said AC signal generator means so as to apply said electromagnetic induction field to said hydrous fuel, wherein said signal has a low frequency ranging from 50 to 260 Hz, a low voltage ranging from 0.5 to 1.5 V and a low current ranging from 1.5 to 8 mA and pressurizing said hydrous fuel by a compressor for supply to said combustion chamber.

* * * * *